(12) United States Patent
Fouhy

(10) Patent No.: US 7,637,523 B2
(45) Date of Patent: Dec. 29, 2009

(54) FLOORBOARD MOUNTED FOOT PEG APPARATUS AND METHOD FOR A MOTORCYCLE

(75) Inventor: Richard Fouhy, Lakeside, CA (US)

(73) Assignee: Aeromach Manufacturing Inc., San Diego, CA (US)

( * ) Notice: Subject to any disclaimer, the term of this patent is extended or adjusted under 35 U.S.C. 154(b) by 322 days.

(21) Appl. No.: 11/228,150

(22) Filed: Sep. 16, 2005

(65) Prior Publication Data

US 2007/0063479 A1  Mar. 22, 2007

(51) Int. Cl.
*B62J 25/00* (2006.01)
(52) U.S. Cl. .......................................... 280/291; 74/564
(58) Field of Classification Search ............. 280/288.4, 280/291, 294, 164.1, 163; 74/564; D12/114
See application file for complete search history.

(56) References Cited

U.S. PATENT DOCUMENTS

| | | | | |
|---|---|---|---|---|
| 4,401,315 A | * | 8/1983 | Pavincic | 280/259 |
| 5,779,254 A | * | 7/1998 | James et al. | 280/291 |
| 6,578,652 B1 | * | 6/2003 | Kobacker et al. | 180/219 |
| 6,688,629 B2 | * | 2/2004 | Essinger | 280/291 |
| 6,719,316 B1 | * | 4/2004 | Anthony | 280/291 |
| 6,893,038 B2 | * | 5/2005 | Egan | 280/291 |
| D528,476 S | * | 9/2006 | Stahel et al. | D12/114 |
| 7,114,739 B2 | * | 10/2006 | Colano | 280/291 |
| 2005/0241435 A1 | * | 11/2005 | Colano | 74/560 |

* cited by examiner

*Primary Examiner*—Tony H. Winner
(74) *Attorney, Agent, or Firm*—Dalina Law Group, P.C.

(57) ABSTRACT

A floorboard mounted foot peg apparatus and method for a motorcycle comprising a mounting block, arm and foot peg. Provides advantage of not being fixedly attached to the safety bar of the motorcycle and therefore provides quick access to foot controls. Apparatus is entirely adjustable allowing for riders of differing leg length to adjust the arm rotationally with respect to the mounting bracket in order to extend or retract the foot peg away from or towards the rider. Allows for turn signal indicators, running lights and fog lamps to be used in combination and allows for mounting each of these light types to any component of the invention including the mounting bracket, arm and foot peg. In addition, the invention provides a stiffener to prevent deformation of the floorboard.

9 Claims, 9 Drawing Sheets

FLOORBOARD MOUNTED FOOT PEG APPARATUS AND METHOD FOR A MOTORCYCLE

BACKGROUND OF THE INVENTION

1. Field of the Invention

Embodiments of the invention described herein pertain to the field of motorcycle accessories. More particularly, but not by way of limitation, one or more embodiments of the invention enable a floorboard mounted foot peg apparatus and method for a motorcycle.

2. Description of the Related Art

Existing devices for improving a motorcycle rider's comfort while riding include "clamp-on highway pegs". Highway pegs are foot pegs that are clamped onto the front safety bar of motorcycles that are equipped with floorboards. Highway pegs allow riders to extend their legs to ease the discomfort of bent legs that normally are placed on the floorboards.

There are many problems associated with clamp-on highway pegs. When mounting clamp-on highway pegs, the rider is required to perform a long leg extension to place their legs on the pegs. Placement of one's legs on the foot pegs also leaves the legs far from the foot controls of the motorcycle, therein causing a safety issue as the time required to reposition feet to the controls is considerable when the legs are fully extended and so far from the foot controls. In addition, safety bar mounted foot pegs are a fixed position from the rider and this fixed-distance mounting does not allow for adjustment of the distance of the pegs from the rider. Most clamp-on highway pegs are also limited in the mounting that may be used in order to hold them to the safety bar.

U.S. Pat. No. 4,802,684 to Bennett, et al., (1989) describes a floorboard. The floorboard is not coupled with a foot peg, but is intended to replace foot pegs altogether.

U.S. Pat. No. 5,826,900 to Steele, (1998) shows a foot peg that is mounted to a motorcycle frame which is not adjustable and not mounted to a floorboard.

U.S. Pat. No. 4,797,791 to Burchick (1989) describes a foot peg coupled with a light. This is another example of a device that is not coupled with a floorboard, but rather is coupled with a motorcycle frame.

For at least the limitations described above there is a need for a floorboard mounted foot peg apparatus and method for a motorcycle.

BRIEF SUMMARY OF THE INVENTION

One or more embodiments of the invention enable a floorboard mounted foot peg apparatus and method for a motorcycle. Embodiments of the invention comprise a mounting block, arm and foot peg. The foot peg is coupled with the arm which is further coupled to the mounting block. The mounting block is coupled with a floorboard on a motorcycle, generally from below the floorboard, but this is not required. A stiffener may be used to provide further stiffness to the floorboard and provides mount points for the mounting block. The stiffener prevents deformation of the floorboard. The coupling between the foot peg and the arm allows the foot peg to be folded for storage and in addition allows for rotational adjustment along the axis of the foot peg. In addition, a set screw may be used to limit the foot peg from folding all of the way out so as to provide an inward angle to keep a riders foot from slipping outward away from the motorcycle.

Embodiments of the invention allow for quick access to the foot controls due to the close placement of the apparatus to the foot controls. Enabling such quick access to the foot controls increases the safety of the rider by providing the rider with the ability to have a quicker response to asynchronous events requiring immediate attention. For example by keeping the distance to the foot peg from the right foot break close, the rider can retrieve the foot off of the right foot peg and displace the right foot brake faster than is possible with safety bar mounted foot pegs that are generally farther away from the brake.

The apparatus is entirely adjustable thereby permitting riders with differing leg lengths to adjust the arm rotationally with respect to the mounting bracket in order to extend or retract the foot peg away from or towards the rider. In addition to the adjustment of the foot peg in rotation and in fold out angle, the arm itself may be rotated along the axis of the bolt coupling the arm to the mounting block. This allows for extension and retraction of the arm and provides a mechanism to fine tune the apparatus to the preferences of the individual riding the motorcycle. Use of a bolt is one example of a coupling mechanism, however any other mechanism for rotationally coupling the arm to the mounting block is in keeping with the spirit of the invention. For example, a spring loaded clamp may be used in order to permit a rider to adjust the arm without requiring a wrench by pulling the spring away from the arm, rotating the arm and then releasing the spring loaded clamp to fix the rotational angle of the arm at the desired offset.

Embodiments of the invention may comprise lights. The lights may be of any type including turn signal indicators, running lights and fog lamps. The lights may also be used in combination with each other and each of these light types may be mounted to the mounting bracket, arm and foot peg or any combination thereof.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A floorboard mounted foot peg apparatus and method for a motorcycle will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
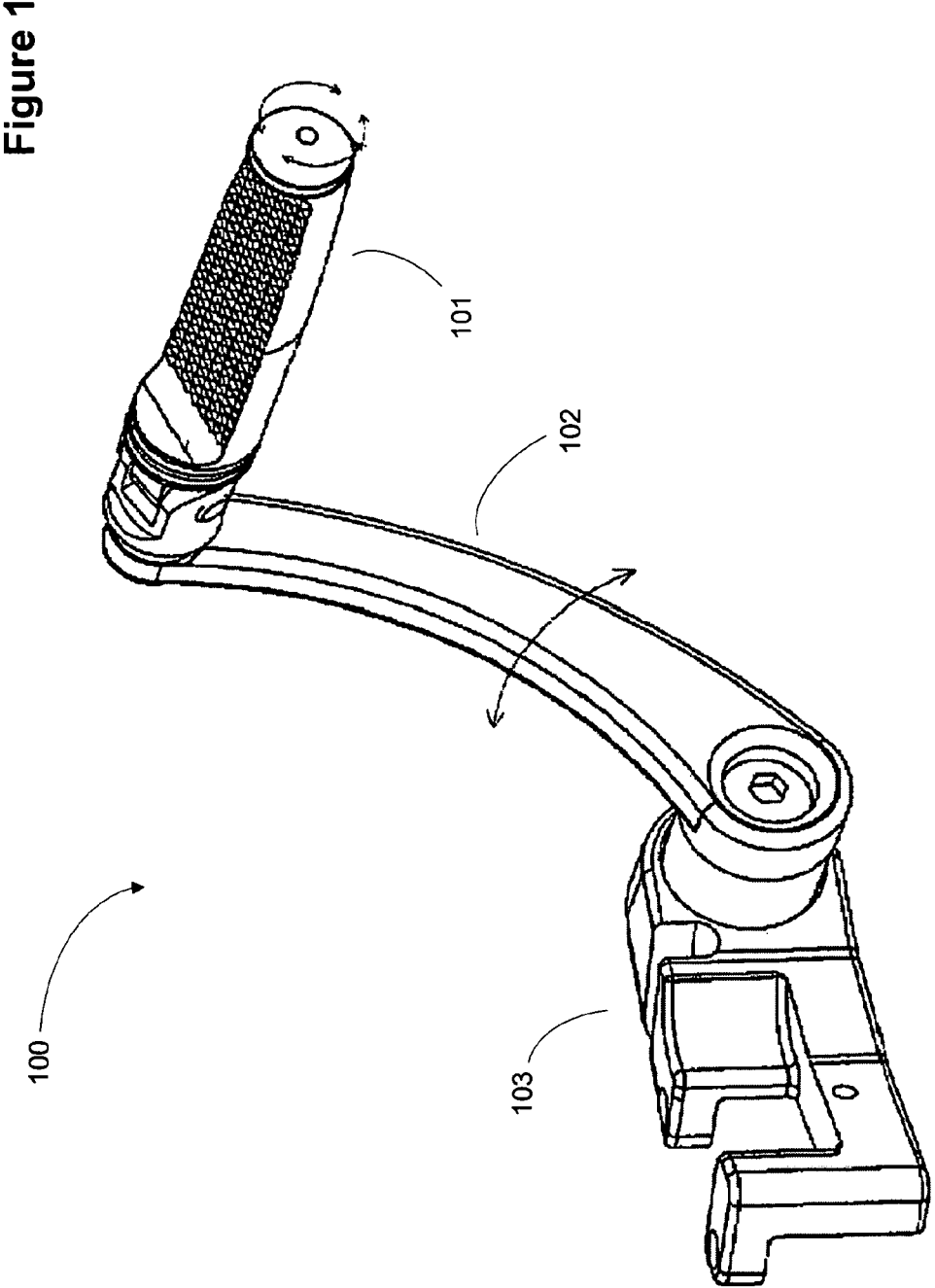
FIG. 1 is a perspective view of an embodiment of the invention in the deployed position.
Figure 2:
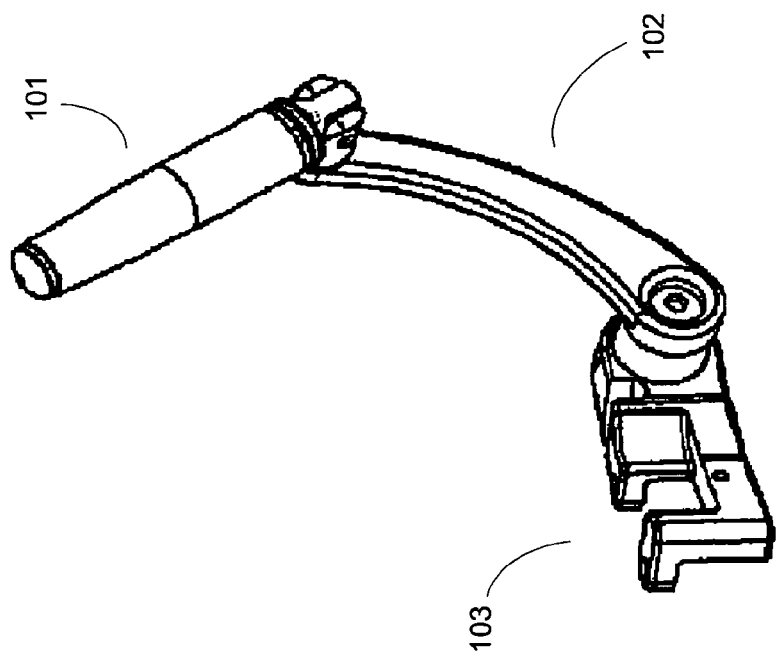
FIG. 2 is a perspective view of an embodiment of the invention in the folded position.

FIG. 1 shows a perspective view of an embodiment of the invention in a deployed position. Embodiments of the invention comprise mounting block 103, arm 102 and foot peg 101. Foot peg 101 is coupled with arm 102 which is further coupled with mounting block 103. Mounting block 103 is coupled with a floorboard on a motorcycle. The coupling between foot peg 101 and arm 102 allows the foot peg to be folded for storage (See FIG. 2) and in addition allows for rotational adjustment along the axis of the foot peg. Mounting block 103 shows a "U" shaped indentation on the left side of mounting block 103 to account for any splines or ribs that may exist on the bottom of a floorboard. The "U" shaped cut out allows for uniform installation regardless of motorcycle floorboard manufacturer. One or more embodiments of the invention may comprise a solid mounting block without a "U" shaped cut for floorboard that comprise a planar surface on their underside.

Figure 3:
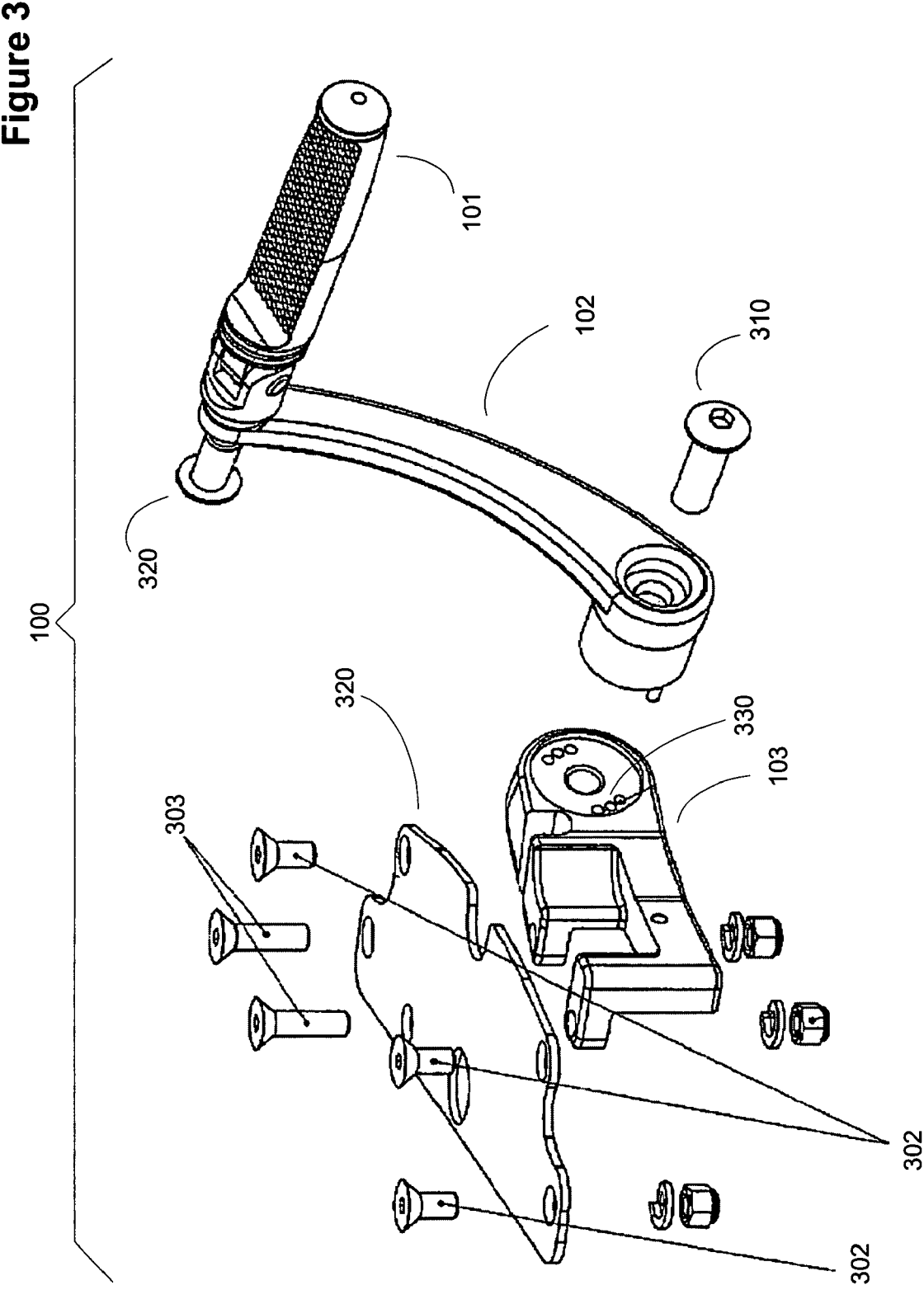
FIG. 3 is an exploded view of an embodiment of the invention.
Figure 5:
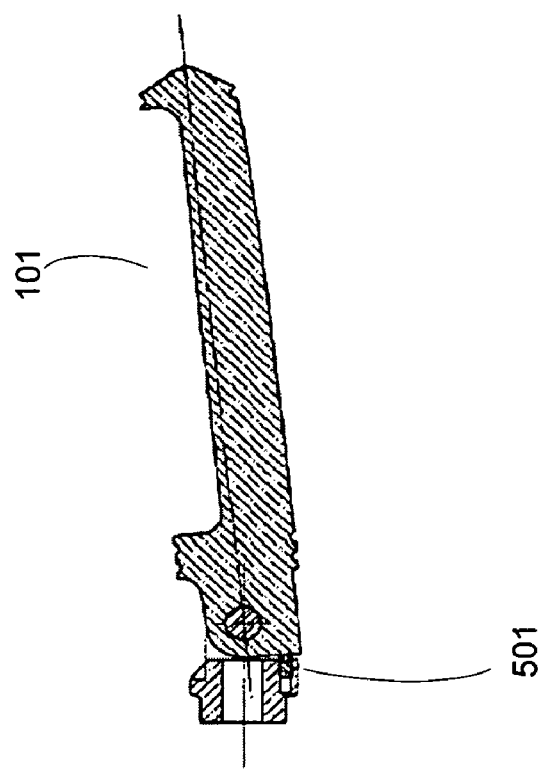
FIG. 5 is a side view of an embodiment of the foot peg having set screw to limit fold-out.
Figure 6:
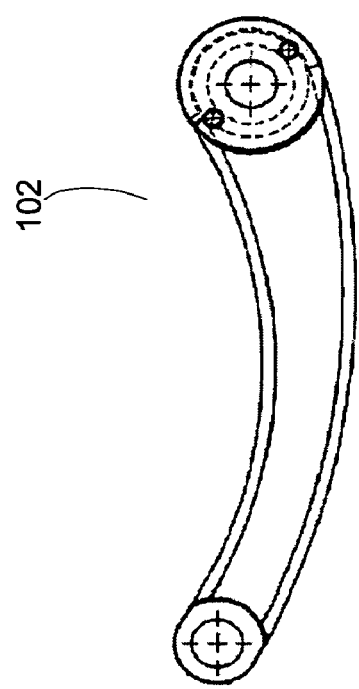
FIG. 6 is a side view of an embodiment of the arm.
Figure 7:
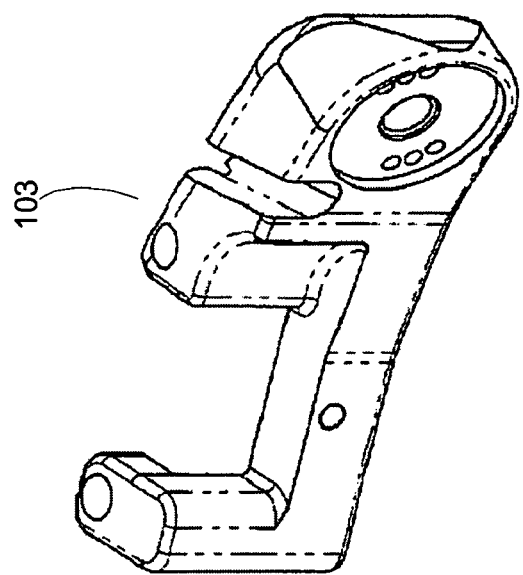
FIG. 7 is a perspective view of an embodiment of the mounting block.

FIG. 3 is an exploded view of an embodiment of the invention. The apparatus is entirely adjustable allowing riders with differing leg lengths to adjust arm 102 rotationally with respect to mounting bracket 103 in order to extend or retract the foot peg away from or towards the rider. In addition to the adjustment of foot peg 101 in rotation (via bolt 320) and in fold out angle (as per set screw 501 of FIG. 5), the arm itself may be rotated along the axis of bolt 310 coupling arm 102 to mounting block 103. This allows for extension and retraction of the arm and provides mechanisms that enable the rider to fine tune the apparatus to the preferences of the individual riding the motorcycle. Use of a bolt such as bolt 310 is one example of a coupling mechanism, however any other mechanism for rotationally coupling the arm to the mounting block is in keeping with the spirit of the invention. For example, a spring loaded clamp may be used to allow a rider to adjust the arm without requiring a wrench by pulling the spring away from the arm, rotating the arm and then releasing the spring loaded clamp to fix the rotational angle of the arm at the desired offset. Although shown with three adjustment holes 330 on each side of axis into which bolt 310 is displaced, mounting block 103 may use any other mechanism to bind arm 102 to a given angle. For example use of any other frictional material or etching with more or less than three displacement holes 330 is in keeping with the spirit of the invention. FIG. 6 is a side view of an embodiment of the arm. FIG. 7 is a perspective view of an embodiment of the mounting block.

Figure 8:
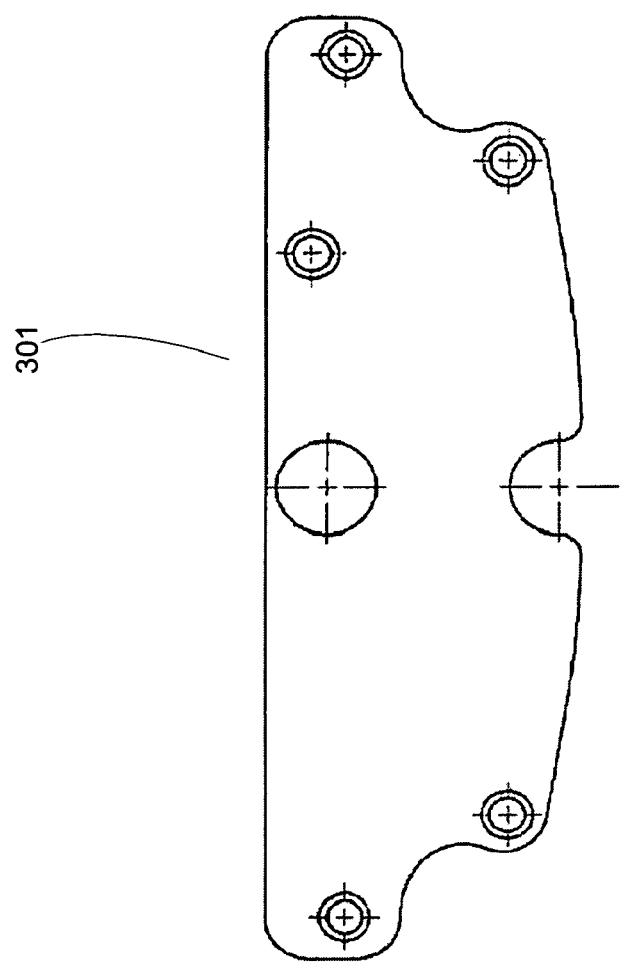
FIG. 8 is a top view of an embodiment of the stiffener.

Stiffener 301 may be used to provide further stiffness to the floorboard and provides mount points for mounting block 103. The stiffener also prevents deformation of the floorboard. Stiffener 301 may be mounted on top of the floorboard, either on top of or under any rubberized surface adhered to the top of the floorboard. Alternatively, the stiffener may be mounted under the floorboard with only screw tops and optional washers originating from the top of the floorboard. In one or more embodiments of the invention two stiffeners may be mounted on opposing sides of the floorboard. Any method of mounting a stiffener on a floorboard is in keeping with the spirit of the invention. FIG. 8 is a top view of an embodiment of the stiffener.

Figure 4:
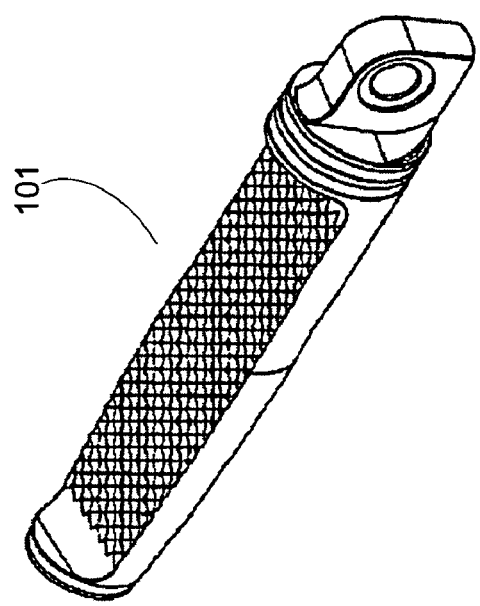
FIG. 4 is a perspective view of an embodiment of the foot peg.

FIG. 4 is a perspective view of an embodiment of the foot peg. One or more embodiments of arm 102 as shown in FIG. 3 may couple with after market foot pegs with standard interfaces or adapters. FIG. 5 is a side view of an embodiment of the foot peg having set screw to limit fold-out. Set screw 501 may be used to limit the foot peg from folding all of the way out so as to provide an inward angle to keep a riders foot from slipping outward away from the motorcycle.

Embodiments of the invention allow for quick access to the foot controls due to the close placement of the apparatus to the foot controls. Quick access to the foot controls increases the safety of the rider by enabling the rider to have a quicker response to asynchronous events requiring immediate attention. For example by keeping the distance to the foot peg from the right foot break close, the rider can retrieve the foot off of the right foot peg and displace the right foot brake faster than is possible with safety bar mounted foot pegs that are generally farther away from the brake.

Embodiments of the invention may comprise lights. The lights may be of any type including turn signal indicators, running lights and fog lamps. The lights may also be used in combination with each other and each of these light types may be mounted to the mounting bracket, arm and foot peg or any combination thereof.

Figure 9:
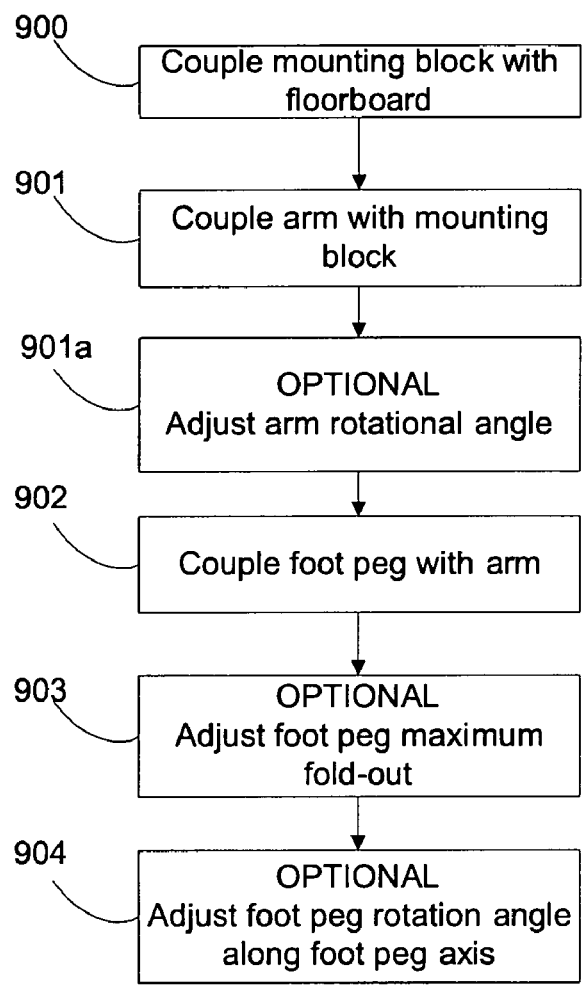
FIG. 9 is a flow chart for utilizing an embodiment of the invention.

FIG. 9 is a flow chart for utilizing an embodiment of the invention. Any order of coupling may be utilized in order to combine elements of the apparatus. Coupling a mounting block with a floorboard of a motorcycle occurs at 900. This may involve removing the rubberized material from the floorboard if such material already exists. Coupling an arm with the mounting block occurs at 901. Generally, a rough first guess can be made based on the size of the rider as to the rotational setting to use for coupling the arm to the mounting block this optional step occurs at 901a. Coupling a foot peg with the arm occurs at 902. The foot peg may be optionally adjusted in terms of maximum foldout by turning set screw at 903 (See set screw 501 in FIG. 5). The foot peg may also be rotationally adjusted along the axis of the foot peg by loosening screw 320 in FIG. 5, rotating the foot peg and re-tightening screw 320.

While the invention herein disclosed has been described by means of specific embodiments and applications thereof, numerous modifications and variations could be made thereto by those skilled in the art without departing from the scope of the invention set forth in the claims.

What is claimed is:

1. A floorboard mounted foot peg apparatus for a motorcycle comprising:
   a foot peg comprising an inner end and an outer end;
   an arm comprising a first end and a second end, wherein said first end of said arm is coupled with said inner end of said foot peg; and,
   a mounting block coupled with said second end of said arm, wherein said mounting block is configured to non-rotationally couple with a floorboard,
   wherein said floorboard is attached to a motorcycle by a preexisting mount.

2. The apparatus of claim 1 wherein said foot peg is rotationally adjustable along an axis parallel to said foot peg.

3. The apparatus of claim 1 wherein said foot peg is foldable to and from said motorcycle.

4. The apparatus of claim 1 wherein said arm is rotationally adjustable with respect to said mounting block.

5. A floorboard mounted foot peg apparatus for a motorcycle comprising:
   a foot peg comprising an inner end and an outer end;
   an arm comprising a first end and a second end, wherein said first end of said arm is coupled with said inner end of said foot peg;
   a mounting block comprising a substantially flat surface, wherein said mounting block is coupled with said second end of said arm and said substantially flat surface of said mounting block is configured to non-rotationally couple with a floorboard; and, a stiffener plate comprising a plurality of mounting points, wherein said stiffener plate is coupled with said mounting block at said mounting points, and said stiffener plate is configured to further secure said mounting block to said floorboard and to limit deformation of said floorboard;

wherein said floorboard is attached to a motorcycle by a preexisting mount.

6. The apparatus of claim 5 wherein said stiffener plate is configured to be positioned next to a top surface of said floorboard.

7. The apparatus of claim 5 wherein said stiffener plate is configured to be positioned next to a bottom surface of said floorboard.

8. A floorboard mounted foot peg kit for a motorcycle comprising:

a foot peg comprising an inner end and an outer end;

an arm comprising a first end and a second end, wherein said first end of said arm is configured to couple with said inner end of said foot peg; and, a mounting block configured to couple with said second end of said arm, wherein said mounting block is configured to non-rotationally couple with a floorboard attached to a motorcycle by a preexisting mount.

9. The kit of claim 8 further comprising a stiffener plate comprising a plurality of mounting points, wherein said stiffener plate is configured to be positioned on a substantially flat surface of said floorboard, and said stiffener plate is further configured to couple with said mounting block at said mounting points.

* * * * *